United States Patent [19]

Sammet

[11] Patent Number: 4,978,005
[45] Date of Patent: Dec. 18, 1990

[54] DISC CONTAINER ASSEMBLY

[76] Inventor: Roy J. Sammet, 6 Highview Dr., Scarsdale, N.Y. 10583

[21] Appl. No.: 443,925

[22] Filed: Nov. 30, 1989

[51] Int. Cl.⁵ .......................................... B65D 85/57
[52] U.S. Cl. .................................. 206/312; 206/311; 206/444; 206/459; 40/641
[58] Field of Search ............... 206/307, 309, 311, 312, 206/444, 459, 806; 40/340, 360, 641, 663

[56] References Cited

U.S. PATENT DOCUMENTS

| | | | |
|---|---|---|---|
| 2,771,076 | 11/1956 | Peter | 206/312 |
| 3,112,966 | 12/1963 | Reid | 206/309 |
| 4,145,726 | 3/1979 | Conaty | 206/309 |
| 4,455,642 | 6/1984 | Inaba | 206/312 |
| 4,630,385 | 12/1986 | Swim | 40/340 |
| 4,632,242 | 12/1986 | Choi et al. | 206/806 |
| 4,682,688 | 7/1987 | Budert | 206/806 |
| 4,793,480 | 12/1988 | Gelardi et al. | 206/444 |

*Primary Examiner*—David T. Fidei
*Attorney, Agent, or Firm*—Ribis, Graham & Curtin

[57] ABSTRACT

A disc container assembly is provided for storing and filing a compact digital audio disc, or the like. The assembly includes container, and an identifier connected thereto. The container has a rear wall with an inner cylindrical recess for holding the disc. The container has top and bottom walls and left and right side walls. The container has a front door, which has top and bottom flanges that respectively overlap the top and bottom walls. The top wall has a pair of cutouts and the top flange has a pair of holes respectively overlapping the cutouts. The identifier has a longitudinal portion, which has indicia identifying the disc, and has a pair of tapered inserts with pointed ends with beveled edges for insertion in and receival by the respective openings.

4 Claims, 2 Drawing Sheets

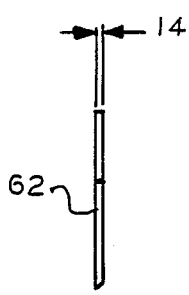
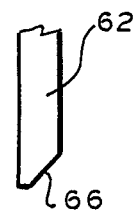
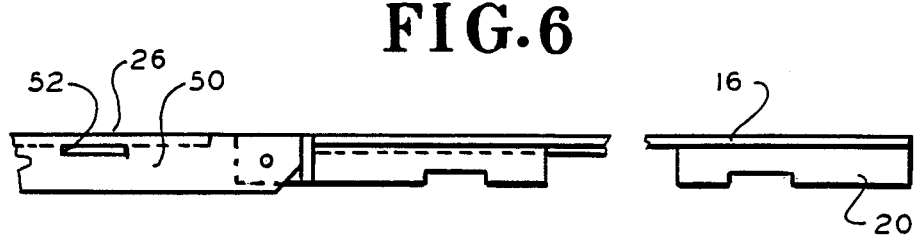
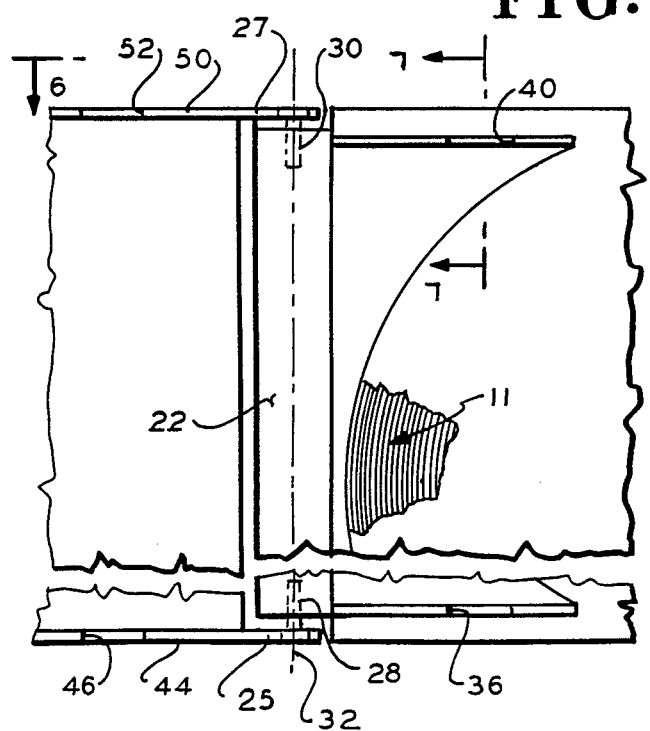
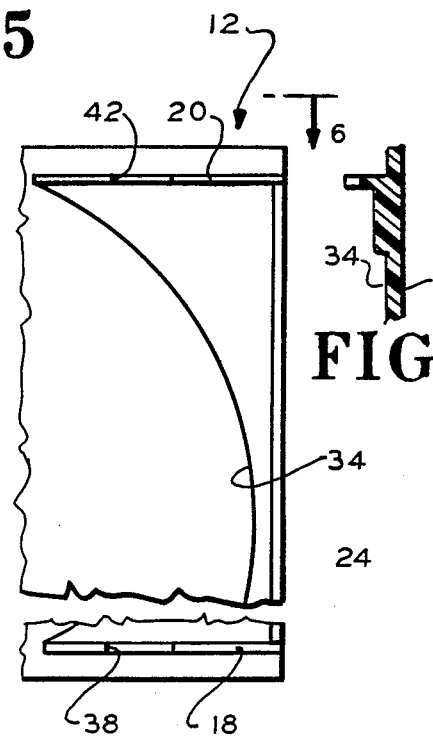

DISC CONTAINER ASSEMBLY

The invention relates to a disc container assembly, and in particular the invention relates to a disc container assembly having a container and an identifier which connects to the container.

BACKGROUND OF THE INVENTION

The prior art disc container assembly includes a container for containing a disc and a label disposed in the container for identifying the disc.

One problem with the prior art disc container is that it is difficult to see the label and thereby identify the disc. This particularly the problem with displays of a quality of discs.

SUMMARY OF THE INVENTION

According to the present invention, a disc container assembly is provided. This assembly comprises a container for containing a disc and an identifier unit mounted on and extending from the container. The container has a wall portion with an opening means. The identifier unit has an insert means projecting therefrom and received in the openings in a snug fit.

By using the identifier insert means and the container wall opening means, a connection is provided, whereby the problem of identifying a disc is eliminated and any difficulty in identification is avoided.

The foregoing and other objects, features and advantages of the invention will be apparent from the following description of the preferred embodiment of the invention as illustrated in the accompanying drawings.

BRIEF DESCRIPTION OF THE DRAWINGS

FIG. 3 is an elevation view as taken along the line 3—3 of FIG. 2.

FIG. 4 is an enlarged view of a portion of FIG. 3.

FIG. 5 is an elevation view of a portion of FIG. 1 in an open condition.

FIG. 6 is a top view as taken along the line 6—6 of FIG. 5; and

FIG. 7 is a section view as taken along the line 7—7 of FIG. 5.

DESCRIPTION OF THE PREFERRED EMBODIMENT

Figure 1:
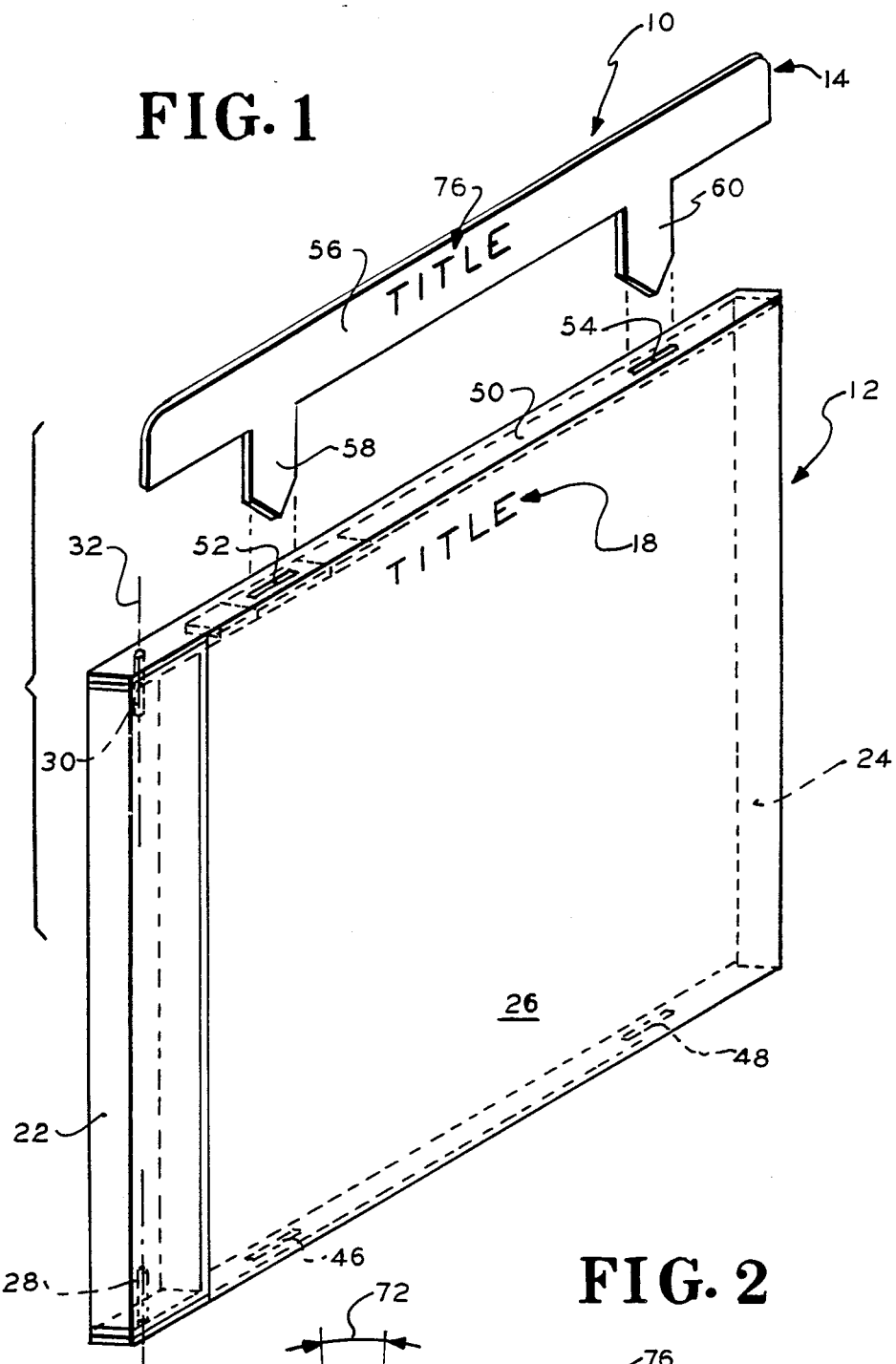
FIG. 1 is a perspective view of a disc container assembly according to the invention.
Figure 2:
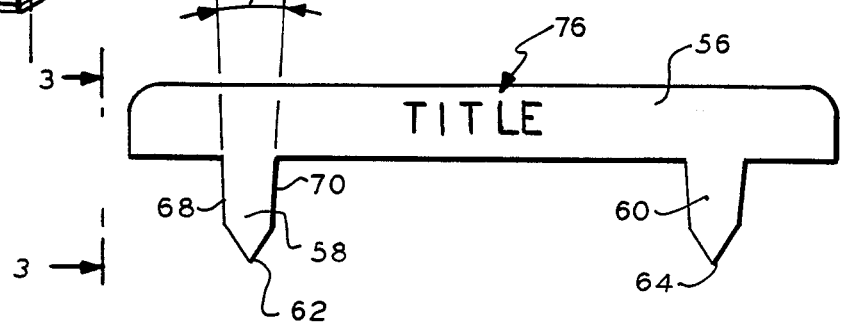
FIG. 2 is an elevation view of a portion of FIG. 1.

As shown in FIG. 1, a disc container assembly 20 is provided for holding or storing or filing a disc 11 such as a compact digital audio disc, or a computer disc, or the like.

The assembly includes a container 12 and an identifier or identification unit 14. Container 12 has a rear wall 16, a bottom wall 18, a top wall 20, a leftside wall or column 22, a rightside wall 24, and a front door 26. Door 26 has a bottom projection 25 and a top projection 27. Projections 25, 27 have respectively a bottom pivot or pin 28 and a top pivot or pin 30. Pivots 28, 30 have a common pivot axis 32. Walls 18, 20, 22, 24 are each fixedly connected to rear wall 16.

Rear wall 16 has a recess portion 34 of cylindrical shape for receiving a disc. The bottom wall 18 has two spaced bottom cutouts 36, 38. The top wall 20 also has two spaced top cutouts 40, 42. Cutouts 36, 40 and 38, 42 are respectively aligned in a vertical direction.

The front door 26 has a bottom flange 44, which has two spaced bottom openings 46, 48, which respectively overlap bottom cutouts 36, 38. Front door 26 also has a top flange 50, which has two spaced top openings 52, 54 which respectively overlap top cutouts 40, 42.

As shown in FIGS. 1, 2, 3 and 4, identifier 14 has a longitudinal portion 56, which is about five inches in length in this embodiment. Identifier 14 also has a left tab or insert 58, which is received in opening 52; and has a right tab or insert 60, which is received in opening 54.

The inserts 58, 60 have pointed rounded ends 62, 64. End 62, like end 64, has a beveled or chisel edge 66. Insert 58, like insert 60, has tapered sides 68, 70, which have an included angle 72 of about four degrees. The pointed ends allow pentration of a plastic wrapping if the container 12 has a wrapping of plastic. It is critical to the invention when using most containers that the distance between the center lines of each of the two ends is approximately 3.28 inches for a standard container.

The identifier 14 also has a uniform thickness 74, which is preferably about forty thousandths of an inch. Identifier 14 also has indicia 76, which is marked thereon, such as the title of the disc, or the like. The front door 26 has similar indicia 78, which is marked thereon, such as the title of the disc 11.

The materials used in identifier 14 is a plastic material, such as polystyrene. The material used in container 12 is also a plastic material Front door 26 and its flanges 44, 50 are transparent. The remaining walls 16, 18, 20, 22, 24 are not transparent.

In use, inserts 58, 60 are assembled or inserted into openings 52, 54. Assembly 10 can be positioned or filed in a vertical position for ease of viewing title 76 on identifier 14. If container 12 is upside down inserts 58, 60 can be inserted into bottom openings 46, 48 respectively.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A disc container assembly comprising: a container holding a disc; an identifier for identifying the disc; and connection means for attaching the identifier to the container, said connection means including opening means disposed in the container and insert means projecting from the identifier, and wherein said container has a rear wall, a bottom wall with cutouts, a top wall with cutouts and left and right side walls all rigidly connected together, and a front wall forming a front door, wherein said front door has a top flange overlapping the top wall and a bottom flange overlapping the bottom wall, and wherein said opening means includes holes disposed in the top flange and overlapping respectively the top cutouts and aligned to receive the insert means.

2. The assembly of claim 1 wherein said opening means includes a pair of cutouts disposed in the bottom wall and respectively aligned with the pair of top cutouts and said opening means includes a pair of holes disposed in the bottom flange and overlapping respectively the bottom cutouts for alternately receiving the pair of inserts.

3. The assembly of claim 1 wherein the front door has pivot means supported by the leftside wall, and wherein the rear wall has a cylindrical inner recess for receiving the disc.

4. The assembly of claim 1, wherein the identifier has a longitudinal portion for resting against the top wall and for supporting said pair of inserts and for marking with an identifying indicia, and wherein each said insert has tapered sides and has a pointed end.

* * * * *